United States Patent [19]

Parker et al.

[11] Patent Number: 4,463,465
[45] Date of Patent: Aug. 7, 1984

[54] FIRE BLOCKING SYSTEMS FOR AIRCRAFT SEAT CUSHIONS

[75] Inventors: John A. Parker, Los Altos; Demetrius A. Kourtides, Gilroy, both of Calif.

[73] Assignee: The United States of America as represented by the Administrator of National Aeronautics and Space Administration, Washington, D.C.

[21] Appl. No.: 452,466

[22] Filed: Dec. 23, 1982

[51] Int. Cl.³ .................. A47C 27/14; B32B 1/00; B32B 5/22

[52] U.S. Cl. .................. 5/459; 297/DIG. 5; 428/71; 428/76; 428/246; 428/280; 428/287; 428/304.4; 428/319.1; 428/423.5; 428/920; 428/921

[58] Field of Search ....... 5/459; 297/DIG. 1, DIG. 5; 428/71, 76, 246, 252, 280, 281, 282, 283, 287, 304.4, 319.1, 423.5, 920, 921

[56] References Cited

U.S. PATENT DOCUMENTS

| | | | |
|---|---|---|---|
| 3,127,135 | 3/1964 | Burr et al. | 428/282 |
| 3,647,609 | 3/1972 | Cyba | 428/316.6 |
| 4,060,280 | 11/1977 | Van Loo | 428/921 |
| 4,092,752 | 6/1978 | Dougan | 5/459 |
| 4,174,420 | 11/1979 | Anolick et al. | 428/304.4 |
| 4,246,313 | 1/1981 | Stengle, Jr. | 428/920 |
| 4,302,496 | 11/1981 | Donovan | 428/920 |
| 4,310,587 | 1/1982 | Beaupre | 428/246 |

OTHER PUBLICATIONS

Kourtides et al., "Test Methodology for Evaluation of Fireworthy Aircraft Seat Cushions.", *The Journal of Fire and Flammability*, vol. 15, No. 1, (Jan. 1982), pp. 56–76.

Primary Examiner—William J. Van Balen
Attorney, Agent, or Firm—Darrell G. Brekke; John R. Manning

[57] ABSTRACT

A configuration and method for reducing the flammability of bodies of organic materials that thermally decompose to give flammable gases is disclosed to comprise covering the body with a flexible matrix that catalytically cracks the flammable gases to less flammable species. Optionally the matrix is covered with a gas impermeable outer layer. In a preferred embodiment, the invention takes the form of an aircraft seat in which the body is a poly(urethane) seat cushion, the matrix is an aramid fabric or felt and the outer layer is an aluminum film.

22 Claims, 6 Drawing Figures

FIRE BLOCKING SYSTEMS FOR AIRCRAFT SEAT CUSHIONS

ORIGIN OF THE INVENTION

The invention described herein was made by employees of the U.S. Government and may be manufactured and used by or for the Government for governmental purposes without the payment of any royalties thereon or therefor.

TECHNICAL FIELD

This invention is in the field of fire resistent configurations for upolstery. More particularly, it relates to a cushion configuration which is resistant to ignition under aircraft postcrash fire conditions.

BACKGROUND ART

One of the largest contributors to the development of a hostile environment inside an aircraft cabin during a fire is the production of flammable and toxic vapors from soft fabrics and furnishings, the bulk of which are contained in the aircraft's seats. The flammable vapors produced by thermal decomposition of conventional foam cushions are considered to be the largest single factor contributing to this hostility factor during such a fire.

Among existing commercially used cushioning polymers, there is probably no better material from mechanical aspects and cost than conventional flexible poly(urethane) foams, and, unfortunately, none more thermally sensitive. These polymers, because of their easily pyrolyzed urethane groups and thermally oxidizable aliphatic linkages, exhibit polymer decomposition temperatures of about 250° C. (508° F.), and maximum pyrolysis rates at about 300° C. (598° F.), with a total yield of pyrolysis vapor of about 95%, most of which is very highly combustible. These polymer materials ignite easily with a low power energy source, and when ignited, effect sustained flame propagation even after removal of the heat source. It is standard practice to add fire retardants to urethane foams. These fire retardants can increase resistance to low temperature ignition. However, from thermogravimetric studies, it is evident that the addition of standard fire retardant additives has little or no effect on the maximum decomposition rate, the temperature at which it occurs, or the vapor production yield. In fact, one observes the same average mass injection rates of combustible gases under a sustained radiant heating from flexible poly(urethane) foams whether fire retarded or not.

In addition, even when conventional flame retardants are present, application of a sustained heating rate of approximately 5 W/cm$^2$ to one poly(urethane) foam seat of a three seat transport array will produce flame spread and ignition to the adjacent seat in less than one minute. This results in sufficient fire growth to permit flames to impinge on the aircraft ceiling in less than two minutes. The time required to produce these events and the resultant increase in cabin air temperature determines the allowable egress times for passengers attempting to escape the aircraft in a postcrash fuel fire. U.S. Pat. No. 4,092,752, issued June 6, 1978 to Dougan and U.S. Pat. No. 3,647,609, issued Mar. 7, 1972 to Cyba have representative disclosures of flame retardants and their use with flammable materials.

Another way to improve seat cushion fire performance is to cover the cushion with a fire blocking layer. These layers can operate in a number of manners. For example, one can use a layer of a less flammable insulative material such as neoprene foam to afford thermal protection. This technique is shown in U.S. Pat. No. 4,060,280, issued Nov. 29, 1977 to Van Loo. Similarly, one can employ a covering which gives a high yield of insulative char when heated. Polyimides and polybenzimidazoles have been among the most widely accepted materials in this role. Heat reflective materials have also been proposed.

Yet another known method to control cushion flammability involves covering cushions with a material that will emit cooling water vapor when heated. This mechanism is commonly referred to as "transpirational cooling". Vonar ®, a family of Al(OH)$_3$ power-doped low density and high char yield poly(chloroprene) foams marketed by E.I. Dupont, contains a large fraction of water of hydration, and is one of the best materials in this class currently available. Materials which depend on transpirational cooling for flammability control can be very efficient at high heat fluxes. Their efficiency increases monotonically with the incident heat flux above 7 W/cm$^2$. However, use of these high performance transpirational blocking layers results in an estimated weight penalty of 1.8 kg per seat. Due to ever-increasing fuel costs, such a penalty can render these blocking layers cost ineffective as fire protection.

Very clearly, there is a pressing need for a cushion construction which affords good fire protection and is cost effective both in terms of weight penalties and intrinsic costs of manufacture and assembly.

STATEMENT OF THE INVENTION

A fundamental mechanism for reducing the flammability hazards of combustible organic materials which decompose at elevated temperatures to combustible organic vapors has now been found. It has been found that the organic material can be covered by a flexible matrix that will react with the combustible organic vapors at the temperature of their generation and catalytically crack them to less combustible species. This matrix can be used alone or in combination with one or more additional coverings which enhance the contact of the combustible vapors with the catalytic matrix. These catalytic matrix materials are relatively light weight and permit a reasonably priced final product. In the most common embodiment, the combustible organic material is a foam cushioning material. As described herein the composites based on the invention are described as aircraft seat cushions. It will be understood by those skilled in the art that this invention is of more general application and is not limited to this preferred application and can be embodied in all manner of forms.

DETAILED DESCRIPTION OF THE INVENTION

Figure 1:
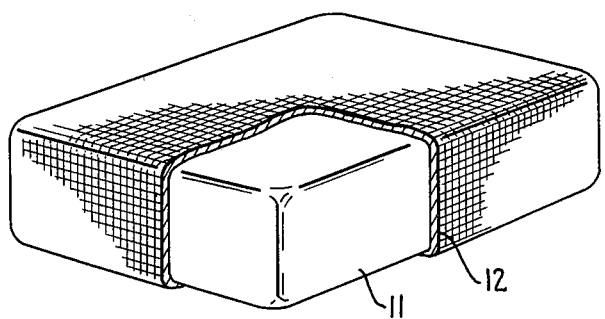
FIG. 1 shows a cut perspective view of a simple fire resistant cushion of the invention.

Turning initially to the figures of the drawings, FIG. 1 shows a simple configuration of a fire resistant composite of this invention. This configuration includes an inner body of combustible material, foam cushion 11, enclosed by a flexible matrix 12 of a vapor cracking material.

The foam used in the cushion is merely representative. The inner material can be of any shape and configuration and merely must include an organic composition that will undergo decomposition at a temperature above about 200° C. (such as from 225° C. to 425° C. and especially 250° C. to 400° C.) to yield combustible organic gases. Such materials include polymer foams-such as poly(urethane) foam, polyethylene, and polyisocyanurate. Poly(urethane) is the material most commonly employed in seat cushions and is the preferred inner material. Unexpectedly, it has been found that non-fire retarded polymer materials give better fire resistance in the present composites than do fire retarded materials. Although not understood with certainty, it is theorized that the flame retardant acts to scavenge free radicals formed during generation of the combustible vapors and that these free radicals advantageously take part in the desired subsequent cracking reaction. Thus their removal by the flame retardant is detrimental.

The cracking matrix is a fabric, felt or mat of fibers of a material which will catalyze the endothermic cracking of the flammable organic gases which result from the decomposition of the interior body such as the interior foam body. These catalyst materials should be relatively high temperature resistant, low conducting materials that are themselves resistant to pyrolysis. Examples of materials meeting this criteria include, for example, fabrics and felts containing the aramid polyamide fibers such as poly(p-phenylene terephthalamide) (marketed as Kevlar ® by E.I. DuPont),

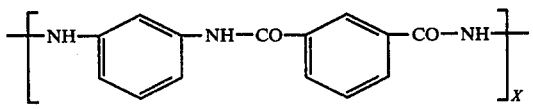

(marketed as Nomex ® by DuPont), fabrics and felts containing heat-stabilized polyacrylonitriles such as the Celiox ® fibers of Celanese, and carbon loaded fabrics. Mixtures of these materials may be used, as well. Particular materials of interest include the Nomex ® fabrics and felts, the Norfab ® fabrics and felts of Gentex Corporation which include about 70% Kevlar ®, 25% Nomex ® and 5% Kynol ® (a fiber made of cross-linked amorphous phenolic polymer and markets by Harbison-Carborundum Corp.); the Preox fabrics made of Celiox and marketed by Gentex Corporation; and the Panox ® carbon loaded fabrics of R-K Textiles (England). In the sample configuration of FIG. 1 it is very important that the catalytic matrix be of a tight weave or packing to permit good contact between the combustible vapors and the catalyst. Generally, this is accomplished with an areal density of at least 0.20 Kg/m² and more preferably at least 0.25 Kg/m². As previously noted, however, there are severe weight constraints imposed on seating in aircraft. With this in mind, it is generally desirable to not have an areal density greater than about 0.75 Kg/m² with real densities below 0.60 Kg/m² being preferred. With the preferred Norfab ®, Preox ® and Celiox ® materials areal densities of 0.30 to 0.50 Kg/m² are typically obtained.

Figure 2:
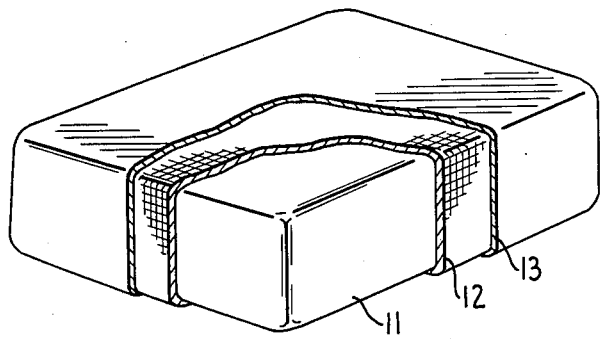
FIG. 2 shows a cut away perspective view of a preferred embodiment of the fire resistant composites of the invention.

A somewhat more involved cushion construction is shown in section in FIG. 2 wherein 11 and 12 are the cushion and catalyst matrix, respectively and 13 is an exterior covering layer. Layer 13 has the properties of being a barrier to passage of the combustible gases generated by decomposition of cushion 11. This keeps the gases in contact with the catalyst. A thin flexible metal foil such as aluminum foil is an excellent gas barrier layer and advantageously also has the property of being relatively heat transmissive so as to redistribute local incident radiation. Other equivalent materials can be used as well, including temperature resistant organic polymers.

A temperature-resistant polymer is a polymer that maintains its integrity at temperatures of up to about 200° C. and can include materials such as aromatic poly(amides), poly(benzamidazoles), heat stabilized poly(acrylonitriles) or combinations thereof include Kevlar ®, Nomex ®, Kynol ® and Celiox ®. This gas barrier layer can be a separate layer, a laminated overlayer or can even be a mere coating or sealant applied over the outside of the catalyst layer. While the Figures show separate layers to make the elements clear, usually for flexibility, laminates and coatings are preferred structures.

Figure 3:
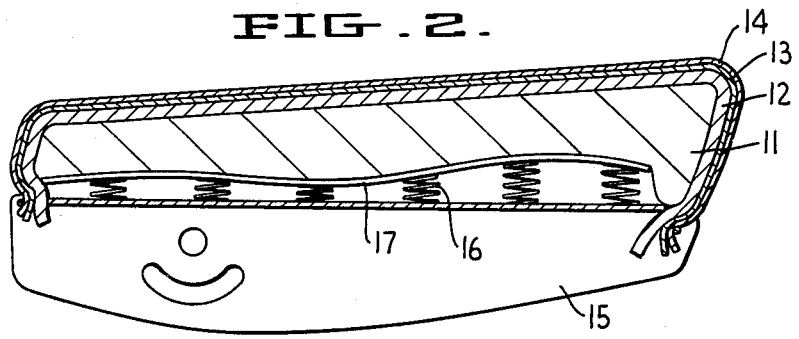
FIG. 3 is a cross-sectional view of an aircraft seat bottom incorporating a fire resistant cushion of the invention.

Turning to FIG. 3, an aircraft seat bottom is shown. The seat bottom includes urethane foam cushion 11 and catalyst matrix 12. It will be noted that the catalyst matrix does not have to completely surround the cushion and as shown here, can function effectively when it merely covers the areas of the cushion which will be directly exposed to temperatures high enough to pyrolyze it. In FIG. 3 the catalyst matrix covers the top and sides of the cushion and is held in place by seat base 15 and spring unit 16. Spring protector 17 serves to prevent the springs from damaging the cushion and also can work as a means to hold the cushion material adjacent to the catalyst matrix in case of a fire. Exterior gas barrier 13 is as described previously. Slip cover 14 is a decorative fabric overlayer of conventional material and construction. Generally it is made of wool or a wool blend. Layers 13 and 14 are also held in place by base 15.

Figure 4:
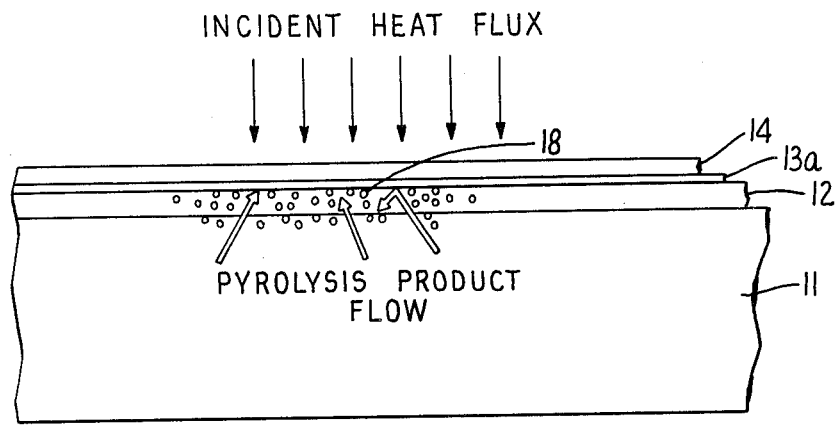
FIG. 4 is a cross-section of a composite of the invention illustrating its mechanism for fire resistance.

In FIG. 4, the fire resistance process of the invention is illustrated mechanistically. Cushion 11, of a suitably flammable and preferably non-fire-retarded material is covered with catalyst matrix 12, which has been over-sealed with a laminate layer of heavy aluminum foil 13a. This is covered by fabric slip cover 14. An incident heat flux of about 5 W/cm² is applied to the covered cushion. In a laboratory setting, this can be done with heaters. In a real setting this would be the result of a fire. Layer 13a, being a heat conductor spreads the heat and minimizes hot spots. This heat flux is great enough to break down the cushion material and form highly flammable gaseous organic pyrolysis products.

These gases are generated where the heat flux impacts the cushion. The pyrolysis gases move as shown by the broad arrows into the catalyst matrix where they are cracked to carbon (coke), tar and like materials which are flammable but far less so than the initial pyrolysis gases. Layer 13a keeps the gases in contact with catalyst matrix 12. The exact pyrolysis and cracking reactions are not known with certainty but it is clearly observed that there is a substantial increase in production of coke and tar and reduction of production of flammable gases when the catalyst layer is present.

It is to be expected that this configuration would not eliminate or consume all the combustible gases generated but importantly it is capable of suppressing mass injection rates of flammable poly(urethane) vapors below the critical value of $8 \times 10^{-4}$ lbs/ft$^2$-sec at 5 W/cm (4.4 btu/ft$^2$-sec) radient heat flux. This value is the value determined to be the threshold for flame spread and subsequent flashover from seat to seat in an aircraft cabin configuration.

A series of experiments and calculations were conducted to illustrate the effectiveness of the catalytic fire protection system of this invention.

The materials used in these experiments are shown in Tables 1 and 2. Two types of foams were used and four types of heat blocking layers. The densities of the foams and the fire blocker layers are also shown in Tables 1 and 2, with an estimate of the seat weight when constructed from these materials. Two flexible poly(urethane) foams were used, a fire-retarded and a non-fire-retarded. The composition of the non-fire-retarded foam was as follows:

| Component | Parts by Weight |
| --- | --- |
| Polyoxypropylene glycol (3000 m.v.) | 100.0 |
| Tolulene diisocyanate (80:20 isomers) | 105 |
| Water | 2.9 |
| Silicone surfactant | 1.0 |
| Triethylenediamine | 0.25 |
| Stannous octoate | 0.35 |

The fire retarded foam had a similar composition but contained an organo-halide compound as a fire-retardant.

TABLE 1

Composite Aircraft Seat Configurations with Fire Resistant Urethane

| SAMPLE NO. (1) | FIRE BLOCKING MATERIAL(2) | AREAL DENSITY kg/m$^2$ | FOAM | DENSITY kg/m$^3$ | SEAT WEIGHT g(3) | % Δ |
| --- | --- | --- | --- | --- | --- | --- |
| A | NONE | | F.R. URETHANE | 29.9 | 2374 | 0 |
| B | VONAR 3 ® COTTON | 0.91 | F.R. URETHANE | 29.9 | 3935 | +66 |
| C | VONAR 2 ® COTTON | 0.67 | F.R. URETHANE | 29.9 | 3525 | +48 |
| D | PREOX ® 1100-4 | 0.39 | F.R. URETHANE | 29.9 | 3039 | +28 |
| E | NORFAB ® 11HT-26-AL | 0.40 | F.R. URETHANE | 29.9 | 3055 | +29 |
| F | 181 E-GLASS | 0.30 | F.R. URETHANE | 29.9 | 2888 | +22 |

TABLE 2

Composite Aircraft Seat Configurations with Non-Fire Resistant Urethane

| SAMPLE NO. (1) | FIRE BLOCKING MATERIAL(2) | AREAL DENSITY kg/m$^2$ | FOAM | DENSITY kg/m$^3$ | SEAT WEIGHT g(3) | % Δ |
| --- | --- | --- | --- | --- | --- | --- |
| G | VONAR 3 ® COTTON | 0.91 | N.F. URETHANE | 16.0 (23.2) | 3205 (3583) | +35 (+51) |
| H | PREOX ® 1100-4 | 0.39 | N.F. URETHANE | 16.0 (23.2) | 2309 (2686) | −2.7 (+13) |
| I | NORFAB ® 11HT-26-AL | 0.40 | N.F. URETHANE | 16.0 (23.2) | 2325 (2703) | −2.1 (+14) |

(1) All configurations covered with wool-nylon fabric, 0.47 Kg/m$^2$.

(2)

| FIRE BLOCKER | AREAL DENSITY Kg/m$^2$ | COMPOSITION | TYPICAL STRUCTURE |
| --- | --- | --- | --- |
| NORFAB ® 11HT-26-AL ALUMINIZED | 0.40 | 70% KEVLAR ® | POLY (p-PHENYLENE TEREPHTALAMIDE) |
| | | 25% NOMEX ® | 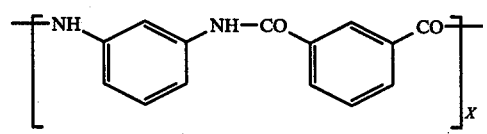 |
| | | 5% KYNOL ® | 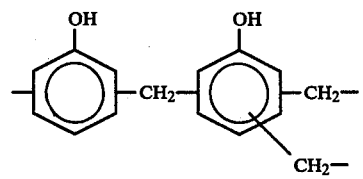 |

-continued

| | | | |
|---|---|---|---|
| PREOX ® 1100-4 | 0.39 | HEAT STABILIZED POLYACRYLO-NITRILE | $\left[\begin{array}{c}H\\O=C\\O\\H\end{array}\begin{array}{c}\\\\\\N\end{array}\begin{array}{c}H\\\\\\\\\end{array}\begin{array}{c}O\\\\\\N\end{array}\begin{array}{c}H\\\\\\N\end{array}\begin{array}{c}\\\\\\N\end{array}\begin{array}{c}\\\\\\\\\end{array}\right]_{7-20} C\begin{array}{c}=O\\NH_2\end{array}$ |
| VONAR 2 ® COTTON | 0.67 | POLY-CHLOROPRENE | $\begin{array}{c}H\\\\H_2C\end{array}C=C\begin{array}{c}CH_2\\\\Cl\end{array}$ |
| VONAR 3 ® COTTON | 0.91 | | |
| 181 E-GLASS FABRIC, SATIN WEAVE | 0.30 | GLASS | $SiO_2$ |

(3) Estimated weight of coach seat consisting of bottom cushion (50.8 × 55.9 × 10.2 cm, back cushion (45.7 × 50.8 × 5.1 cm) and head rest (45.7 × 20.3 12.7 cm

MASS INJECTION COMPARISON

The rate of generation of flammable pyrolysis gases from heated samples was determined at various heating rates for each of the materials set forth in Tables 1 and 2.

In this study, a non-flaming heat radiation condition was simulated. 7.6 cm×7.6 cm samples made to resemble full-size seat cushions were tested for weight loss when exposed to different heat fluxes from an electrical heater. The measurements were conducted in a modified NBS smoke density chamber.

The test equipment for recording and processing of weight-loss data consists of an NBS smoke chamber modified by the installation of an internal balance (ARBOR model #1206) connected to a HP 5150A thermal printer, providing simultaneous print-outs of weight remaining and time elapsed.

The NBS smoke chamber was further modified to permit a heat flux of 2.5–7.5 W/cm² by installing a heater capable of yielding a high radiant flux on the face of the sample. This heater is available from Deltech Inc. The heater was calibrated at least once a week using a water-cooled calorimeter connected to a millivoltmeter. Using the calibration curve provided by the manufacturer, the voltages which provided the desired heat fluxes (2.5, 5.0 and 7.5 W/cm²), were determined.

All samples shown in Tables 1 and 2, were sandwich structures made up as miniature seat cushions. The sandwiches consisted of a cushioning foam inside a wrapping of a heat blocking layer and a wool-nylon fabric. To simplify the assembly, the heat blocking layer and the fabric were fixed together with a stapler followed by wrapping them around the foam and then fixed in place by sewing the edges together with thread. Prior to assembly, the individual components were weighed on an external balance and the results, together with other relevant data, were recorded.

The test was initiated by exposing the sample to the heat flux from the heater and by starting the thermal printer. The test then ran for the decided length of time (1, 2, 3, 4 or 5 minutes) and was terminated by pulling an asbestos shield in front of the sample. When a stable reading on the printer was obtained (indicating that no more gases originating from the foam were injected into the chamber from the sample), the printer was shut off. The sample was taken out and allowed to cool down to room temperature.

The burned area on the side of the sample facing the heater was measured in order to standardize the test. This area was normally around 5 cm×5 cm and since the sample size was 7.5 cm×7.5 cm, this was thought to minimize edge effects (that is, changes in the heat spread pattern through the sample caused by the heat blocking layer folded around the sides of the foam cushion).

Finally, the sample was cut open and the remainder of the foam scraped free from the heat blocking layer and weighed on the external balance. This was done to determine the amount of foam that had been vaporized and injected into the surroundings.

The samples shown in Tables 1 and 2 were exposed to heat flux levels of 2.5, 5.0 and 7.5 W/cm². After the weight loss of the urethane foam was determined, as described previously, the specific mass injection rate was calculated as follows:

$$\dot{m} = \frac{\text{(weight loss)}}{\text{(area of sample exposed to heat)} \times \text{(time elapsed)}} \quad \frac{g}{cm^2, s}$$

The area exposed to heat was brought into the equation in an effort to standardize the test runs in terms of how much radiant energy that has actually been absorbed by the sample.

Then the figure of merit (F.O.M.) was calculated as follows:

$$F.O.M. = \frac{\text{(heat flux)}}{\text{(specific mass injection rate)}} \quad \frac{W, s}{g}$$

Figure 5:
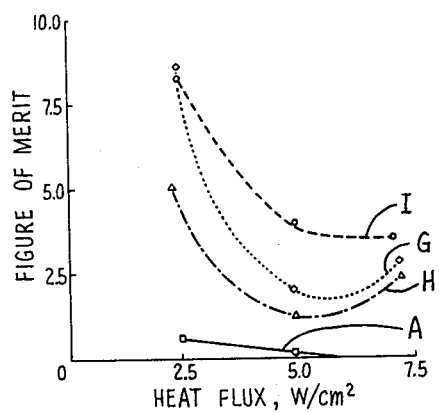
FIGS. 5 and 6 are graphs illustrating the fire resistance properties of composites of the invention and comparing these properties with prior materials.

The F.O.M. values at various heat fluxes were determined and averaged over the time of the exposure. The results obtained with the non-fire retarded foam are illustrated in FIG. 5 and show that the materials of this invention (H and I) made with non-fire retarded poly(urethane) show improvement substantially over the presently used fire-retarded poly(urethane) illustrated as A. Material G, a Vonar ® covered material, gave results between the two materials of the invention but as shown in Table 2 presented an unacceptable weight penalty.

Figure 6:
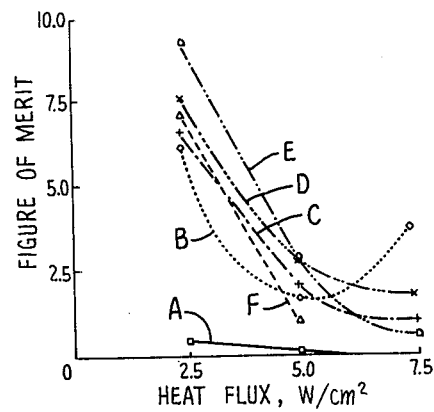

The results obtained with fire-retarded poly(urethane) based materials are given in FIG. 6. Again, the materials of the invention (D and E) gave far better results than conventional fire retarded urethane alone, and were generally superior or equal to the heavy Vonar ® protected materials and substantially better than the fiberglass covered comparative material.

Examination of the used test samples of the invention verified that degradation of the surface of the poly(urethane) foam cushion had occured and that the back-surface of these fire blocker systems behave as an efficient catalytic surface, producing rapid pyrolysis of the potentially flammable vapor (and thus, immediate prevention of their escape into the environment). Further, this endothermic pyrolysis action produced an intrinsic fire ablation mechanism, and finally, yet a third protective mechanism ensues, in that the pyrolysis process produces a thin (but effective) char layer from the poly(urethane) itself, strengthening the overall ablative mechanism from the fire blocking layer of the invention. This three-fold bonus action, which is non-operative in the absence of the fire blocking layer itself, provides a considerable degree of synergism between the fire blocking layer and the central foam cushion. More interestingly, this synergism was stronger with non-fire resistant foam (a lighter and more desirable core cushion) than with fire resistant foam.

It was seen that the mechanistic role of the aluminum is two fold: first, it serves as a delocalizing heat conductor; and second, it provides a vapor barrier to increase the residence time of the gases in the fabric (loosely woven fabrics do not exhibit this effect without aluminum protection) thereby enhancing pyrolysis and char-layer formation.

We claim:

1. A composite comprising a body of a material characterized as producing combustible organic vapors when exposed to a temperature above 250° C., covered by a flexible matrix of a material that will, at said temperature, catalyze vapor phase cracking of said combustible organic vapors to less combustible species.

2. The composite of claim 1 wherein the material characterized as producing combustible organic vapors is an organic polymeric foam.

3. The composite of claim 2 wherein the flexible matrix is a fabric or felt comprising a member selected from the group consisting of aramide poly(amide), heat stabilized poly(acrylonitrile) and carbon loaded fabric.

4. The composite of claim 3 wherein said organic polymeric foam is poly(urethane) foam.

5. The composite of claim 4 wherein said poly(urethane foam) is not fire resistant.

6. The composite of claim 5 wherein the flexible matrix is an aramid poly(amide).

7. The composite of claim 5 wherein the flexible matrix is a fabric or felt comprising poly(p-phenylene terephthalamide), meta-substituted polyaramide, and amorphous crosslinked phenolic polymer.

8. The composite of claim 1 additionally comprising an outer layer of a second material said second material being substantially impermeable by said combustible organic vapors.

9. The composite of claim 2 additionally comprising an outer layer of a second material said second material being substantially impermeable by said combustible organic vapors.

10. The composite of claim 3 additionally comprising an outer layer of a second material said second material being substantially impermeable by said combustible organic vapors.

11. The composite of claim 4 additionally comprising an outer layer of a second material said second material being substantially impermeable by said combustible organic vapors.

12. The composite of claim 11 wherein the outer layer is an aluminum film.

13. The composite of claim 5 additionally comprising an outer layer of a second material said second material being substantially impermeable by said combustible organic vapors.

14. The composite of claim 13 wherein the outer layer is an aluminum film.

15. The composite of claim 6 additionally comprising an outer layer of a second material said second material being substantially impermeable by said combustible organic vapors.

16. The composite of claim 15 wherein the outer layer is an aluminum film.

17. The composite of claim 7 additionally comprising an outer layer of a second material said second material being substantially impermeable by said combustible organic vapors.

18. The composite of claim 17 wherein the outer layer is an aluminum film.

19. A fire resistant cushion comprising an inner core of foamed organic polymer characterized as producing combustible organic vapors when exposed to a temperature above 250° C. covered by a flexible matrix of a material that will, at said temperature, catalyze the vapor phase cracking of said combustible organic vapors to less combustible species.

20. The fire resistant cushion of claim 19 wherein said foamed organic polymer is non-fire retarded poly(urethane) foam, said flexible matrix is a fabric or felt comprising aramid poly(amide) and wherein cushion comprises an outer layer of a second material, said second material being substantially impermeable to said combustible organic vapors.

21. The fire resistant cushion of claim 20 wherein said outer layer is an aluminum film.

22. In a poly(urethane) aircraft seat cushion, the improvement comprising covering the cushion with a flexible matrix of a material that will catalyze the vapor phase cracking of poly(urethane) thermal decomposition products and covering the matrix with an outer covering of aluminum film thereby rendering the cushion flame resistant without an increase in weight.

* * * * *